(12) United States Patent
Ikeda et al.

(10) Patent No.: US 9,236,604 B2
(45) Date of Patent: Jan. 12, 2016

(54) NEGATIVE ELECTRODE AND LITHIUM ION SECONDARY BATTERY

(71) Applicant: TDK CORPORATION, Tokyo (JP)

(72) Inventors: Yasuhiro Ikeda, Tokyo (JP); Atsushi Sano, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 13/846,260

(22) Filed: Mar. 18, 2013

(65) Prior Publication Data

US 2013/0260243 A1   Oct. 3, 2013

(30) Foreign Application Priority Data

Mar. 27, 2012  (JP) ................................ 2012-070949
Mar. 13, 2013  (JP) ................................ 2013-050348

(51) Int. Cl.
*H01M 4/134* (2010.01)
*H01M 4/131* (2010.01)
*H01M 4/38* (2006.01)
*H01M 4/485* (2010.01)
*H01M 4/02* (2006.01)

(52) U.S. Cl.
CPC .............. *H01M 4/134* (2013.01); *H01M 4/131* (2013.01); *H01M 4/386* (2013.01); *H01M 4/485* (2013.01); *H01M 2004/021* (2013.01); *Y02E 60/122* (2013.01)

(58) Field of Classification Search
CPC ....................................................... H01M 4/134
USPC ........................................................ 429/218.1
See application file for complete search history.

(56) References Cited

U.S. PATENT DOCUMENTS

| 2004/0009402 | A1 | 1/2004 | Adachi et al. |
| 2007/0202365 | A1 | 8/2007 | Sawa et al. |
| 2010/0190060 | A1 | 7/2010 | Ugaji et al. |
| 2012/0244435 | A1* | 9/2012 | Hirose et al. ................... 429/211 |
| 2012/0295155 | A1* | 11/2012 | Deng et al. ...................... 429/200 |

FOREIGN PATENT DOCUMENTS

| JP | A-2003-297369 | 10/2003 |
| JP | A-2008-277031 | 11/2008 |
| JP | 2011134584 A * | 7/2011 ............. H01M 4/13 |
| JP | A-2011-134584 | 7/2011 |

* cited by examiner

*Primary Examiner* — Karie O'Neill Apicella
(74) *Attorney, Agent, or Firm* — Oliff PLC

(57) ABSTRACT

A negative electrode includes a negative electrode active material layer containing a negative electrode active material mainly containing silicon and silicon oxide. In the negative electrode, the ratio of the film thickness of the negative electrode active material layer to the particle size distribution D99 is in the range of 1.2 to 2.0, the value of the D99 is in the range of 7 to 27 μm, and the negative electrode active material layer has a density ranging from 1.2 to 1.6 g/cm$^3$.

4 Claims, 1 Drawing Sheet

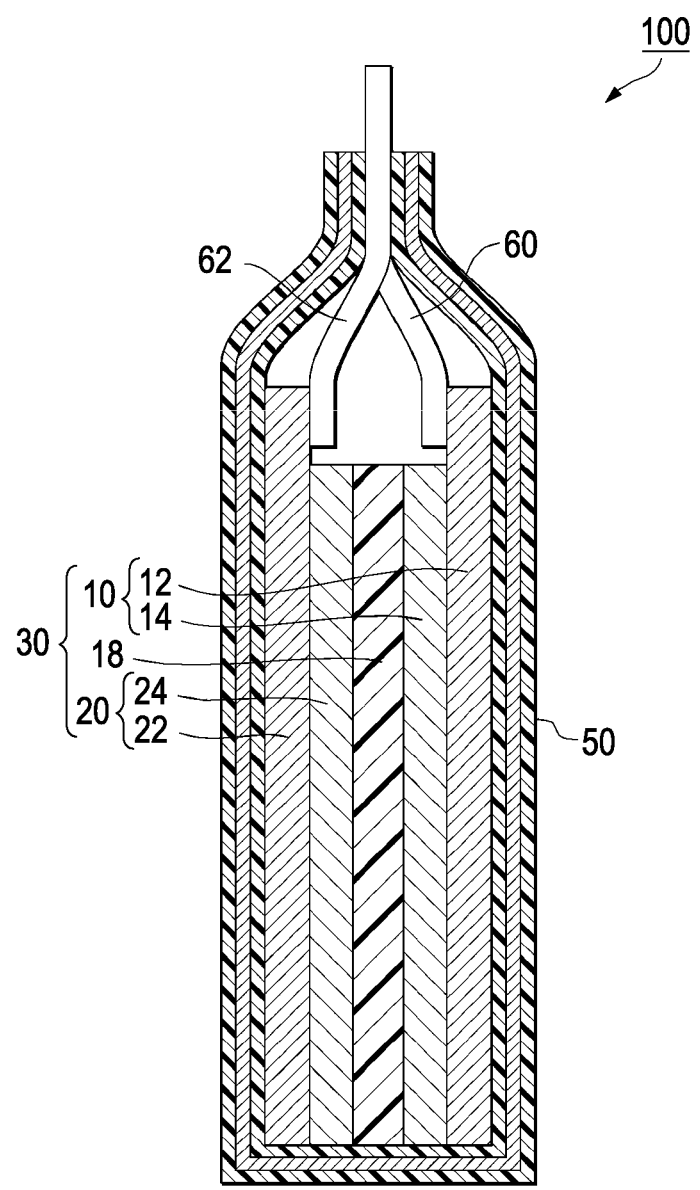

NEGATIVE ELECTRODE AND LITHIUM ION SECONDARY BATTERY

BACKGROUND

1. Technical Field

The present disclosure relates to a negative electrode and a lithium ion secondary battery.

2. Related Art

Lithium ion secondary batteries are lighter in weight and higher in capacity than nickel-cadmium batteries, nickel-metal hydride batteries, and the like. The lithium ion secondary battery has been therefore widely used as a power source for a mobile electronic appliance. Further, as the mobile electronic appliances decrease in size and increase in functionality in recent years, the lithium ion secondary battery has been expected to have further higher capacity. Not just for the mobile electronic appliances, furthermore, the high-capacity lithium ion secondary battery has been a strong candidate as a power source to be mounted on a hybrid vehicle, an electric vehicle, or the like.

The capacity of the lithium ion secondary battery mainly depends on an active material of an electrode. In general, for example, a negative electrode active material contains graphite. However, for meeting the above demand, a negative electrode active material with higher capacity has been desired. Therefore, silicon has attracted attention as a material for the negative electrode active material. Silicon has mud higher theoretical capacity (4210 mAh/g) than the theoretical capacity (372 mAh/g) of graphite.

In a negative electrode active material including a mixture of silicon and silicon oxide, the stress caused by expansion and shrinkage of silicon during charging and discharging is relaxed by silicon oxide. The mixture is therefore considered to have superior cycle characteristics to silicon. However, the mixture of silicon and silicon oxide has poor electric conductivity. As a result, when the current density during discharging is high relative to the battery capacity, the use of this mixture as the negative electrode active material causes a significant decrease in discharge capacity. On the other hand, the power source for a hybrid vehicle and an electric vehicle is desired to have high discharge capacity at high rate. Therefore, the use of this mixture as the material of the negative electrode active material of such a power source has a problem.

JP-A-2008-277031 has disclosed a technique for increasing the discharge capacity at high rate. A secondary battery according to this technique has a current collector that reversibly intercalates and deintercalates lithium ions. At least one surface of this current collector is provided with a concave part and a convex part. Further, this secondary battery has columnar bodies each formed on the convex pan of the current collector. In this configuration, a space part is formed between the columnar bodies. Therefore, the columnar bodies can intercalate and deintercalate lithium from the entire periphery.

SUMMARY

A negative electrode includes a negative electrode active material layer containing a negative electrode active material mainly containing silicon and silicon oxide. In the negative electrode the ratio of the film thickness of the negative electrode active material layer to the particle size distribution D99 is in the range of 1.2 to 2.0, the value of the D99 is in the range of 7 to 27 μm, and the negative electrode active material layer has a density ranging from 1.2 to 1.6 g/cm$^3$.

BRIEF DESCRIPTION OF DRAWINGS

FIG. 1 is a schematic cross-sectional view of a lithium ion secondary battery according to an embodiment of the present disclosure.

DETAILED DESCRIPTION

In the following detailed description, for purpose of explanation, numerous specific details are set forth in order to provide a thorough understanding of the disclosed embodiments. It will be apparent, however, that one or more embodiments may he practiced without these specific details. In other instances, well-known structures and devices are schematically shown in order to simplify the drawing.

However, the secondary battery according to JP-A-2008-277031 has a grain boundary in the columnar body. This grain boundary interrupts the electron conduction. Therefore, the rate characteristic is not improved sufficiently. Moreover, silicon and silicon oxide are hard and fragile. Therefore, when the density of as coating film with silicon particles and silicon oxide particles having large D99 is increased by rolling or the like, the negative electrode active material including this coating film is damaged. Thus, the number of grain boundaries in the negative electrode active mated al increases.

Moreover, even when the D50 is small, the number of grain boundaries in the negative electrode active material layer increases. The density of the negative electrode active material decreases as the number of grain boundaries increases. Thus, the conductivity of the negative electrode active material is decreased manufacturing process for the electrode includes a step of applying an electrode coating to a metal foil with a slit die coater or the like. In this step, an aggregate of negative electrode active material particles is pushed into a gap part (slit) that discharges the coating. This might cause the thickness of the coating film to be non-uniform. For suppressing such a trouble, the thickness of the coating film has generally been set approximately 5 to 10 times larger than the D99 of the negative electrode active material particle.

An object of the present disclosure is to provide a negative electrode and a lithium ion secondary battery having high discharge capacity at high rate.

A negative electrode according to the present disclosure (present negative electrode) includes a negative electrode active material layer containing as negative electrode active material mainly containing silicon and silicon oxide. The ratio of the film thickness of this negative electrode active material layer to the particle size distribution D99 is in the range of 1.2 to 2.0, the value of D99 is in the range of 7 to 27 μm, and the density of the negative electrode active material layer is in the range of 1.2 to 1.6 g/cm$^3$.

The present negative electrode having such a configuration can suppress the decrease in electric conductivity. Therefore, the present negative electrode can have high discharge capacity at high rate.

A lithium ion secondary batter having the present negative electrode can have high discharge capacity at high rate.

According to the present disclosure, the negative electrode and the lithium ion secondary battery having high discharge capacity at high rate can be provided.

A preferred embodiment of the present disclosure, is hereinafter described with reference to drawings. Note that the present disclosure is not limited to the following embodiment. Moreover, the components described below include components that can be easily conceived by those skilled in the art and components that are substantially the same as those components. Furthermore, the components described below can be combined with one another as appropriate.

FIG. 1 is a schematic cross-sectional view of a lithium ion secondary battery 100 according to an embodiment of the present disclosure. As depicted in FIG. 1, a lithium ion secondary battery 100 mainly includes a laminate 30, a case 50, a pair of leads 60 and 62 connected to the laminate 30, and an electrolyte solution containing lithium ions. The case 50 houses the laminate 30 and the electrolyte solution in a sealed slate.

The laminate 30 includes a positive electrode 10, a negative electrode 20 facing the positive electrode 10, and a separator 18. The separator 18 is held between the positive electrode 10 and the negative electrode 20 in Contact with a main plane of the positive electrode 10 and a main plane of the negative electrode 20.

The positive electrode 10 includes as positive electrode current collector 12, and a positive electrode active material layer 14 formed on the positive electrode current collector 12 The negative electrode 20 includes a negative electrode current collector 22, and a negative electrode active material layer 24 formed on the negative electrode current collector 22. The separator 18 is disposed between the negative electrode active material layer 24 and the positive electrode active material layer 14.

The positive electrode active material layer 14 contains at least a positive electrode active material and a conductive auxiliary agent. Any material can be used as the positive electrode active material as long as the material, can intercalate and deintercalate lithium ions, perform intercalation and deintercalation of lithium ions, or perform reversible, doping and de-doping of lithium ions and counter anions of the lithium ions for example, $PF_6$). The positive electrode active material of the positive electrode active material layer 14 includes a known positive electrode active material.

The positive electrode active material contains, for example, lithium cobaltate ($LiCoO_2$), lithium nickelate ($LiNiO_2$) or lithium manganese spinel ($LiMn_2O_4$). Alternatively, the positive electrode active material contains for example, a composite metal oxide. The composite metal oxide contained in the positive electrode active material is represented by, for example, the general formula; $LiNi_xCo_yMn_zM_aO_2$ ($x+y+z+a=1$, $0\leq x\leq 1$, $0\leq y\leq 1$, $0\leq z\leq 1$, and $0\leq a\leq 1$, where M represents one or more elements selected from Al, Mg, Nb, Ti, Cu, Zn, and Cr). Alternatively, furthermore, the positive electrode active material contains, for example, a lithium vanadium compound ($LiV_2O_5$). Olivine type $LiMPO_4$ (where M represents one or more elements selected from Co, Ni, Mn, Fe, Mg, Nb, Ti, Al, and Zr, or Vo), or lithium titanate ($Li_4Ti_5O_{12}$).

The conductive auxiliary agent contains, for example, a carbon material such as carbon blacks, a powder of metal such as copper, nickel, stainless steel, or iron, a mixture of the carbon material and the powder of metal, or a conductive oxide such as ITO. The carbon material preferably contains carbon with a tap density of 0.03 to 0.09 g/ml and carbon with a tap density of 0.1 to 0.3 g/ml. The positive electrode active material layer 14 may contain a binder that binds the active material and the conductive auxiliary agent. The positive electrode active material layer 14 is formed through a step of applying a coating to the positive electrode current collector 12. Here, the coating includes the positive electrode active material, the binder, to solvent, the conductive auxiliary agent, and the like.

The negative electrode active material layer 24 contains at least a negative electrode active material and a conductive auxiliary agent in a manner similar to the positive electrode active material layer 14, the negative electrode active material layer 24 is formed through a step of applying a coating, including the negative electrode active material and the like to the negative electrode current collector 22.

The negative electrode active material according to this embodiment (present negative electrode active material) mainly contains silicon and silicon oxide. As silicon oxide, for example, silicon monoxide (SiO), silicon dioxide ($SiO_2$), or the like can be used. The negative electrode active material may contain one kind of silicon oxide, or two or more kinds of silicon oxides.

In this specification, the negative electrode active material mainly containing silicon and silicon oxide means a negative electrode active material in which the sum (mass ratio) of the mass of silicon and the mass of silicon oxide is 90 mass % or more with respect to the total mass of the negative electrode active material. From the viewpoint of achieving higher theoretical capacity, the mass ratio is preferably 95 mass % or more and more preferably 100 mass %.

As for the adjustment of the particle size distribution of the negative electrode active material, the value of the particle size distribution D99 of the negative electrode active material and the value of the ratio (D99/D50) of D99 to the particle size distribution D50 can be adjusted by air classification, an ultrasonic sieving, or the like. The particle size distribution of the negative electrode active material can be measured by a laser diffraction and scattering type measurement device. The D99 is preferably in the range of 7 to 27 μm, more preferably in the range of 10 to 26 μm. The D99/D50 is preferably in the range of 2 to 3.5.

When the value of the D99 is too small, the number of grain boundaries increases, resulting in a decrease in electric conductivity of the negative electrode. When the value of the D99 is too large, the negative electrode active material cracks at the time of rolling the negative electrode. This increases the number of grain boundaries. Thus, the electric conductivity of the negative electrode decreases. Moreover, when the ratio of D99 to D50 is too large, the number of grain boundaries increases, so that the electric conductivity of the negative electrode decreases. On the other hand, when the ratio of D99 to D50 is too small, the packing ratio of the coating film decreases. Thus, the electric conductivity of the negative electrode decreases.

For instance, a coating method is an exemplary method for manufacturing the negative electrode with the negative electrode active material after the classification. However, the coating, method is not limited to a specific one. Examples of the coating method include methods generally employed for producing the negative electrode. In particular, the coating methods include, for example, a slit die coating method and a doctor blade method.

A method of removing the solvent from the coating applied to the current collectors 12 and 22 is not particularly limited. This method may include, for example, drying the current collectors 12 and 22 to which the coating has been applied under an atmosphere of 80° C. to 150° C. The amount of coating applied to the negative electrode is adjusted so that the film thickness of the negative electrode active material layer after the pressing is in the range of 5 to 40 μm.

The negative electrode having the negative electrode active material layer 24 formed in this manner may be pressed using, for example, a roll pressing device as necessary. The linear pressure of the roil pressing may be for example, 100 to 2000 kgf/cm. Through this pressing process, the film thickness and density of the negative electrode active material layer 24 can be adjusted. The film thickness and the density of the negative electrode active material layer 24 are preferably adjusted so that the ratio of the film thickness of the negative electrode active material layer 24 to the particle size distribution D99 is in the range of 1.2 to 2.0 and the density of the negative electrode active material layer 24 is in the range of 1.2 to 1.6 g/cm$^3$.

This can suppress the decrease in electric conductivity, which is caused when the density of the negative electrode active material layer 24 is too low, and can suppress the decrease in liquid retention property of an electrolyte solution. Which is caused when the density of the negative electrode active material layer 24 is too high. Thus, the decrease in discharge capacity caused by these can be suppressed.

For setting the particle size distribution of the present negative electrode active material, the film thickness of the negative electrode active material layer, and the density of the negative electrode active material layer each in a desired range, the production conditions such as the air classification of the negative electrode active material, the pressing condition lot the negative electrode, and the coating condition can be adjusted as appropriate.

The separator 18 may have an electrically insulating porous structure. The material of the separator 18 includes, for example, a single-layer body or a laminate including a film of polyethylene, polypropylene, or polyolefin, an extended filing of a mixture including any of the above resins and a fiber nonwoven fabric including at least one constituent selected from the group consisting of cellulose, polyeter, and polypropylene.

The electrolyte solution may be, for example, a nonaqueous solvent (organic solvent) in which a lithium salt is dissolved. Examples of the lithium salt include $LiPF_6$, $LiClO_4$, $LiBF_4$, $LiAsF_6$, $LiCF_3SO_3$, $LiCF_3$, $CF_2SO_3$, $LiC(CF_3SO_2)_3$, $LiN(CF_3SO_2)_2$, $LiN(CF_3CF_2)O_2$, $LiN(CF_3SO_2)(C_4F_9SO_2)$, $LiN(CF_3CF_2CO)_2$, and LiBOB. Any of these salts may be used alone or in combination of two or more kinds thereof.

Examples of the preferable organic solvent include propylene carbonate, ethylene carbonate, diethyl carbonate, dimethyl carbonate, and methyl ethyl carbonate. Any of these may be used alone or in combination of two or more kinds thereof in arbitrary proportion. The organic solvent preferably includes a mixture of cyclic carbonate and chain carbonate. The organic solvent particularly preferably contains at least ethylene carbonate and diethyl carbonate from the viewpoint of the balance between discharge capacity and a cycle characteristic.

EXAMPLES

Hereinafter, the present invention is described more specifically with reference to examples and comparative examples. However, the present invention is not limited to the examples below.

Example 1

(Production of negative electrode Active Material)

Si and SiO were mixed at a ratio of Si/SiO=½ (weight ratio). Then, this mixture was crushed and mixed by a planetary ball mill. Alumina beads with a diameter of 3 mm were used as media of the planetary ball mill, the number of rotations of the planetary ball mill was set to 500 rmp, and the crushing and mixing time was set to 60 minutes. Consequently, a negative electrode active material with a D99 of 18 μm and a ratio D99/D50 of 2.7 was obtained.

(Production of Negative Electrode)

A slurry for the negative electrode active material layer was prepared by mixing 83 parts by mass of the negative electrode active material, 2 parts by mass of acetylene black, 15 parts by mass of polyamide-imide, and 82 parts by mass of N-methylpyrrolidone. This slurry was applied onto a surface of a 14-μm-thick copper foil so that the amount of coating of the negative electrode active material was 3 mg/cm$^2$, and then dried at 100° C. to give a negative electrode active material layer. After that, the negative electrode (copper foil with the slurry applied thereto) was press-formed by roller pressing. Thus, the film thickness and the density of the negative electrode active material layer in the negative electrode were adjusted to 29 μm and 1.4 g/cm$^3$, respectively. Subsequently, the negative electrode was thermally treated in vacuum at 350° C. for three hours. Thus, a negative electrode according to Example 1 was obtained.

(Production of Lithium Ion Secondary Battery for Evaluation)

A laminate including the negative electrode produced as described above, a counter electrode (positive electrode) including a copper foil with a lithium metal foil attached thereto, and a separator including a polyethylene porous film held between the electrodes was formed. This laminate was placed in an aluminum laminated package. Then, a $LiPF_6$ solution (solvent: EC (ethylene carbonate)/DEC (diethyl carbonate)=3/7 (volume ratio)) with a concentration of 1 M (1 mol/L) was injected as the electrolyte solution into this aluminum laminated package. Subsequently, the aluminum laminated package was sealed under vacuum. Consequently, a lithium ion secondary battery according to Example 1 for evaluation was obtained.

Examples 2 to 21 and Comparative Examples 1 to 8

Lithium ion secondary batteries for evaluation according to Examples 2 to 21 and Comparative Examples 1 to 8 were produced in a manner similar to Example except that the batteries each included the negative electrode active material layer having the film thickness, the D99, the ratio D99/D50, and the density indicated in Table 1.

The discharge capacity at high rate (high-rate characteristic) of the lithium ion secondary batteries for evaluation according to the examples and comparative examples were evaluated. In this evaluation, a secondary battery charging/discharging testing device was used. Each secondary battery was charged and discharged with the voltage ranging from 0.005 V to 2.5 V at discharge rates (current values) of 1 C and 5 C. Note that 1 C=1600 mAh/g. Thus, the discharge capacity (discharge capacity retention) at 5 C relative to the discharge capacity at 1 C was measured. The results are shown in Table 1.

TABLE 1

|  | film thickness of negative electrode active material layer (μm) | D99 (μm) | film thickness of negative electrode active material layer/D99 | D99/D50 | density of negative electrode active material layer (g/cm3) | discharge capacity retention (%) |
| --- | --- | --- | --- | --- | --- | --- |
| Example 1 | 29 | 18 | 1.61 | 2.7 | 1.4 | 78 |
| Example 2 | 29 | 26 | 1.20 | 2.7 | 1.4 | 73 |
| Example 3 | 34 | 18 | 1.89 | 2.7 | 1.4 | 75 |
| Example 4 | 39 | 20 | 1.95 | 2.7 | 1.4 | 72 |
| Example 5 | 27 | 18 | 1.50 | 2.7 | 1.4 | 76 |
| Example 6 | 19 | 10 | 1.90 | 2.6 | 1.4 | 76 |
| Example 7 | 14 | 7 | 2.00 | 2.8 | 1.4 | 74 |
| Example 8 | 29 | 18 | 1.61 | 2.7 | 1.2 | 75 |
| Example 9 | 21 | 13 | 1.62 | 2.7 | 1.4 | 77 |
| Example 10 | 34 | 21 | 1.62 | 2.7 | 1.4 | 76 |
| Example 11 | 29 | 18 | 1.61 | 2.7 | 1.6 | 73 |
| Example 12 | 29 | 18 | 1.61 | 2.7 | 1.2 | 72 |
| Example 13 | 29 | 18 | 1.61 | 2.7 | 1.3 | 75 |
| Example 14 | 29 | 18 | 1.61 | 2.7 | 1.5 | 76 |
| Example 15 | 29 | 18 | 1.61 | 2.7 | 1.6 | 75 |
| Example 16 | 29 | 18 | 1.61 | 2.2 | 1.4 | 74 |
| Example 17 | 29 | 18 | 1.61 | 3.5 | 1.4 | 71 |
| Example 18 | 29 | 18 | 1.61 | 3.0 | 1.4 | 73 |
| Example 19 | 29 | 18 | 1.61 | 2.0 | 1.4 | 64 |
| Example 20 | 29 | 18 | 1.61 | 3.7 | 1.4 | 63 |
| Example 21 | 39 | 27 | 1.44 | 2.7 | 1.4 | 65 |
| Comparative Example 1 | 44 | 18 | 2.44 | 2.7 | 1.4 | 58 |
| Comparative Example 2 | 20 | 18 | 1.11 | 2.7 | 1.4 | 53 |
| Comparative Example 3 | 44 | 18 | 2.44 | 1.7 | 1.4 | 53 |
| Comparative Example 4 | 44 | 18 | 2.44 | 3.7 | 1.4 | 52 |
| Comparative Example 5 | 20 | 18 | 1.11 | 1.7 | 1.4 | 54 |
| Comparative Example 6 | 20 | 18 | 1.11 | 3.7 | 1.4 | 51 |
| Comparative Example 7 | 29 | 18 | 1.61 | 2.7 | 1.1 | 50 |
| Comparative Example 8 | 29 | 18 | 1.61 | 2.7 | 1.8 | 52 |

As Table 1 indicates, Examples 1 to 21 provided excellent high-rate characteristics but Comparative Examples 1 to 8 failed to provide sufficient high-rate characteristics. The negative electrode according to the present disclosure may be a negative electrode containing a negative electrode active material mainly containing silicon and silicon oxide, in which the ratio of the film thickness of the negative electrode active material layer to the particle size distribution D99 of the negative electrode active material is in the range of 1.2 to 2.0, the value of D99 is in the range of 7 to 27 μm, and the density of the negative electrode active material layer is in the range of 1.2 to 1.6 g/cm$^3$.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A negative electrode comprising a negative electrode active material layer containing a negative electrode active material mainly containing silicon and silicon oxide, wherein:
   a ratio of a film thickness of the negative electrode active material layer to a particle size distribution D99 is in the range of 1.2 to 2.0;
   a value of the D99 is in the range of 7 to 27 μm, and
   the negative electrode active material layer has a density ranging from 1.2 to 1.6 g/cm$^3$.

2. The negative electrode according to claim 1, wherein the value of the D99 is in the range of 10 to 26 μm.

3. The negative electrode according to claim 1, wherein a ratio of the particle size distribution D99 to a particle size distribution D50 in the negative electrode active material layer is in the range of 2 to 3.5.

4. A lithium ion secondary battery comprising the negative electrode according to claim 1.

* * * * *